United States Patent [19]
Lin et al.

[11] Patent Number: 5,982,569
[45] Date of Patent: Nov. 9, 1999

[54] READ/WRITE DATA INTERFACE AND METHOD OF OPERATION

[75] Inventors: Tsen-Hwang Lin, Dallas; Phillip A. Congdon, Richardson, both of Tex.

[73] Assignee: Texas Instruments Incorporated, Dallas, Tex.

[21] Appl. No.: 08/912,038

[22] Filed: Aug. 15, 1997

[51] Int. Cl.$^6$ ........................................ G11B 5/02
[52] U.S. Cl. .................. 360/67; 360/32; 360/110
[58] Field of Search ...................... 360/67, 68, 65, 360/55, 39, 46, 32, 110

[56] References Cited

U.S. PATENT DOCUMENTS

| | | | |
|---|---|---|---|
| 5,241,429 | 8/1993 | Holsinger | 360/67 X |
| 5,764,451 | 6/1998 | Katz | 360/67 X |

OTHER PUBLICATIONS

Article, "Silicon Micromachined SCALED* Technology", IEEE Transactions on Industrial Electronics, Denny K. Miu and Yu–Chong Tai, vol. 42 No. 3 Jun. 1995, pp.234–239.

Article, "Silicon Microstructure and Microactuators for Compact Computer Disk Drives", Silicon Microstructure and Microactuators for Compact Computer Disk Drives, Denny K. Miu, pp. 1–12.

Primary Examiner—Muhammad Edun
Attorney, Agent, or Firm—W. Daniel Swayze, Jr.; Wade James Brady, III; Richard L. Donaldson

[57] ABSTRACT

A read/write data interface (26) is provided that interfaces with a read/write head (28) and is positioned in close proximity to the read/write head (28). The read/write data interface (26) includes a pre-amplifier (46) and a read channel (44). The pre-amplifier (46) amplifies an analog read signal and generates an amplified analog read signal in response. The read channel (44) receives the amplified analog read signal and generates a digital read signal in response.

18 Claims, 2 Drawing Sheets

READ/WRITE DATA INTERFACE AND METHOD OF OPERATION

TECHNICAL FIELD OF THE INVENTION

This invention relates in general to the field of mass storage devices, and more particularly to a read/write data interface and method of operation.

BACKGROUND OF THE INVENTION

Hard disk drives include a stack of magnetically coated platters that are used for storing information. The magnetically coated platters are mounted together in a stacked position through a spindle which may be referred to as a platter stack. The platter stack is typically rotated by a motor that is referred to as a spindle motor or a servo motor. A space is provided between each platter to allow a read/write head or slider to be positioned on each side of each platter so that information may be stored and retrieved. Information is stored on each side of each platter and is generally organized into sectors, tracks, zones, and cylinders.

Each of the read/write heads or sliders are mounted to one end of a dedicated suspension arm so that each of the read/write heads may be positioned as desired. The opposite end of each of the suspension arms are coupled together at a voice coil motor to form one unit or assembly that is positionable by the voice coil motor. Each of the suspension arms are provided in a fixed position relative to each other. The voice coil motor positions all the suspension arms so that the active read/write head is properly positioned for reading or writing information. The read/write heads or sliders may move from at least an inner diameter to an outer diameter where data is stored. This distance may be referred to as a data stroke.

Hard disk drives also include a variety of electronic circuitry for processing data and for controlling its overall operation. This electronic circuitry may include a pre-amplifier, a read channel, a write channel, a servo controller, a motor control circuit, a read-only memory (ROM), a random-access memory (RAM), and a variety of disk control circuitry to control the operation of the hard disk drive and to properly interface the hard disk drive to a system bus. The pre-amplifier may contain a read pre-amplifier and a write pre-amplifier that is also referred to as a write driver. The pre-amplifier may be implemented in a single integrated circuit or in separate integrated circuits such as a read pre-amplifier and a write pre-amplifier or write driver. The disk control circuitry generally includes a separate microprocessor for executing instructions stored in memory to control the operation and interface of the hard disk drive.

Hard disk drives perform write, read, and servo operations when storing and retrieving data. Generally, a write operation includes receiving data from a system bus and storing the data in the RAM. The microprocessor schedules a series of events to allow the information to be transferred from the RAM to the platters through the write channel. Before the information is transferred, the read/write heads are positioned on the appropriate track and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head after first being amplified by the pre-amplifier.

In a read operation, the appropriate sector to be read is located and data that has been previously written to the platters is read. The appropriate read/write head senses the changes in the magnetic flux and generates a corresponding analog read signal. The analog read signal is provided back to the electronic circuitry where the pre-amplifier amplifies the analog read signal. The amplified analog read signal is then provided to the read channel where the read channel conditions the signal and detects "zeros" and "ones" from the signal to generate a digital read signal. The read channel may condition the signal by amplifying the signal to an appropriate level using automatic gain control (AGC) techniques. The read channel may then filter the signal, to eliminate unwanted high frequency noise, equalize the channel, detect "zeros" and "ones" from the signal, and format the digital read signal. The digital read signal is then transferred from the read channel and is stored in the RAM. The microprocessor may then communicate to the host that data is ready to be transferred.

The read channel may be implemented using any of a variety of known or available read channels. For example, the read channel may be implemented as a peak detection type read channel or as a more advanced type of read channel utilizing discrete time signal processing. The peak detection type read channel involves level detecting the amplified analog read signal and determining if the waveform level is above a threshold level during a sampling window. The discrete time signal processing type read channel synchronously samples the amplified analog read signal using a data recovery clock. The sample is then processed through a series of mathematical manipulations using signal processing theory to generate the digital read signal. There are several types of discrete time signal processing read channels such as a partial response, maximum likelihood (PRML) channel; an extended PRML channel; an enhanced, extended PRML channel; a fixed delay tree search channel; and a decision feedback equalization channel.

As the disk platters are moving, the read/write heads must align or stay on a particular track. This is accomplished by the servo operation through the use of a servo controller provided in a servo control loop. In a servo operation, a servo wedge is read from a track that generally includes track identification information and track misregistration information. The track misregistration information may also be referred to as position error information. The position error information may be provided as servo bursts and may be used during both read and write operations to ensure that the read/write heads are properly aligned on a track. As a result of receiving the position error information, the servo controller generates a corresponding control signal to position the read/write heads by positioning the voice coil motor. The track identification information is also used during read and write operations so that a track may be properly identified.

Hard disk drive designers strive to provide higher capacity drives that operate at a high signal-to-noise ratio and a low bit error rate. To achieve higher capacities, the areal density of the data stored on each side of each platter must be increased. This places significant burdens on the hard disk drive electronic circuitry. For example, as the areal density increases, the magnetic transitions that are used to store data on the platters must be physically located more closely together. This often results in intersymbol interference when performing a read operation. As a result, the hard disk drive electronic circuitry must provide more sophisticated processing circuitry that operates at higher frequencies to accurately process the intersymbol interference and the higher frequency read signal. In some cases, the spindle motor speed is increased which further increases the frequency of the read signal and the write signal. Furthermore, the increase in areal density requires that the servo control system be provided with a higher bandwidth to increase the read/write head positioning resolution.

As a consequence, additional electrical noise is often introduced into the hard disk drive system which may decrease the signal-to-noise ratio and increase the bit error rate. The higher frequency read and write signals are also more susceptible to noise than the lower frequency read and write signals present in lower capacity hard disk drives. More specifically, in higher capacity hard disk drives, noise is introduced into the analog read signal during read operations between the read/write heads and the read pre-amplifier, and between the read pre-amplifier and the read channel. For example, any noise that is introduced into the system between the active read/write head and the read pre-amplifier will be amplified by the read pre-amplifier. Similarly, noise is introduced into the analog write signal during write operations between the write channel and the write pre-amplifier, and between the write pre-amplifier and the read/write heads. Overall, this results in a decrease in the signal-to-noise ratio and an increase in the bit error rate. Other problems also arise due to the distance between the read/write heads and the pre-amplifier. For example, the distance between the pre-amplifier and the read/write heads introduces undesirable capacitive effects.

SUMMARY OF THE INVENTION

From the foregoing it may be appreciated that a need has arisen for a read/write data interface and method of operation that provides a pre-amplifier and read channel in close proximity to each of the various read/write heads so that the signal-to-noise ratio is increased and so that the bit error rate is decreased. In accordance with the present invention, a read/write data interface and method of operation are provided which substantially eliminate the disadvantages and problems outlined above.

According to the present invention, a read/write data interface is provided that interfaces with a read/write head and is positioned in close proximity to the read/write head. The read/write data interface includes a pre-amplifier and a read channel. The pre-amplifier amplifies an analog read signal and generates an amplified analog read signal in response. The read channel receives the amplified analog read signal and generates a digital read signal in response. The digital read signal may then be provided to the read/write head.

According to another aspect of the present invention, a method for operating a read/write data assembly that is positioned in close proximity to a read/write head is provided. The method includes various steps such as receiving an analog read signal and generating an amplified analog read signal in response. The method further includes the step of generating a digital read signal.

The present invention provides numerous technical advantages. A technical advantage of the present invention includes an enhanced signal-to-noise ratio when operating a hard disk drive. Another technical advantage of the present invention includes a decreased overall bit error rate when operating a hard disk drive. The increased signal-to-noise ratio and the decreased bit error rate allow data to be reliably and accurately stored and retrieved. Still yet another technical advantage of the present invention includes increased overall hard disk drive storage capacity. The overall hard disk drive storage capacity is increased because the improved signal-to-noise ratio and bit error rate allow data to be stored more densely. Also, the improved signal-to-noise ratio and bit error rate allow for increased platter or spindle speeds which results in the ability to design higher capacity hard disk drives. Another technical advantage of the present invention includes a reduction in undesirable capacitive effects that are often introduced due to the distance between the pre-amplifier and the read/write heads. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
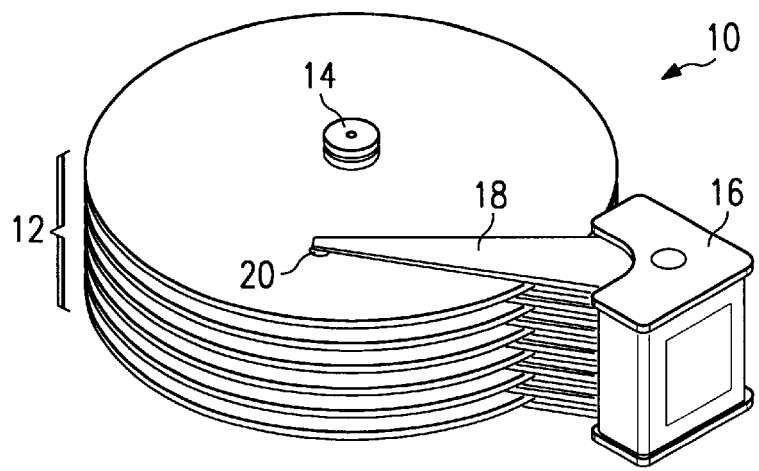
FIG. 1 is a perspective view illustrating an exemplary hard disk drive assembly that includes a platter stack, a voice coil motor, and a plurality of suspension arms extending to each side of each platter.

FIG. 1 is a perspective view illustrating an exemplary hard disk drive assembly 10 that includes a platter stack 12, a voice coil motor 16, and a plurality of suspension arms, such as suspension arm 18, extending to each side of each platter. The various platters of platter stack 12 are mounted through a spindle 14 in a concentric manner so that each of the platters may rotate simultaneously using spindle 14. Spindle 14 is rotated through a spindle motor, not shown in FIG. 1, which is generally provided at or near the bottom of platter stack 12 and spindle 14. Each of the platters of platter stack 12 are mounted in such a manner that a space is provided between each platter so that a suspension arm and a read/write head assembly 20 may extend to each side of each platter.

Voice coil motor 16 is used to position each of the plurality of suspension arms and their corresponding read/write head assembly 20. It should be noted that voice coil motor 16 will preferably simultaneously position all of the plurality of suspension arms and corresponding read/write head assemblies. Voice coil motor 16 provides a rotational force at one end of the plurality of suspension arms so that the opposite end of each one of the plurality of suspension arms extends from an outer diameter to an inner diameter on each side of each platter of platter stack 12 where data is stored. This results in read/write head assembly 20 having access to all data storage areas of platter stack 12.

Focusing now on suspension arm 18 and read/write head assembly 20 as an exemplary suspension arm and read/write head assembly, it is noted that read/write head assembly 20 is provided at one end of suspension arm 18. In alternative embodiments, it should be understood that read/write head assembly 20 may be positioned or coupled to suspension arm 18 at any intermediate point between the two ends of suspension arm 18. In still other embodiments, read/write head assembly 20 may not couple directly to suspension arm 18. Suspension arm 18 may also include a routing tube, not shown in FIG. 1, for exchanging any needed signals with read/write head assembly 20. An exemplary routing tube is discussed more fully below in relation to FIG. 2.

In operation, each of the platters of platter stack 12 rotate by means of the spindle motor which provides rotational motion to spindle 14. After achieving a desired speed, voice coil motor 16, while performing a read, write, or servo operation, positions one of the plurality of suspension arms at a desired track and sector location so that information may be read from or written to the desired sector.

Figure 2:
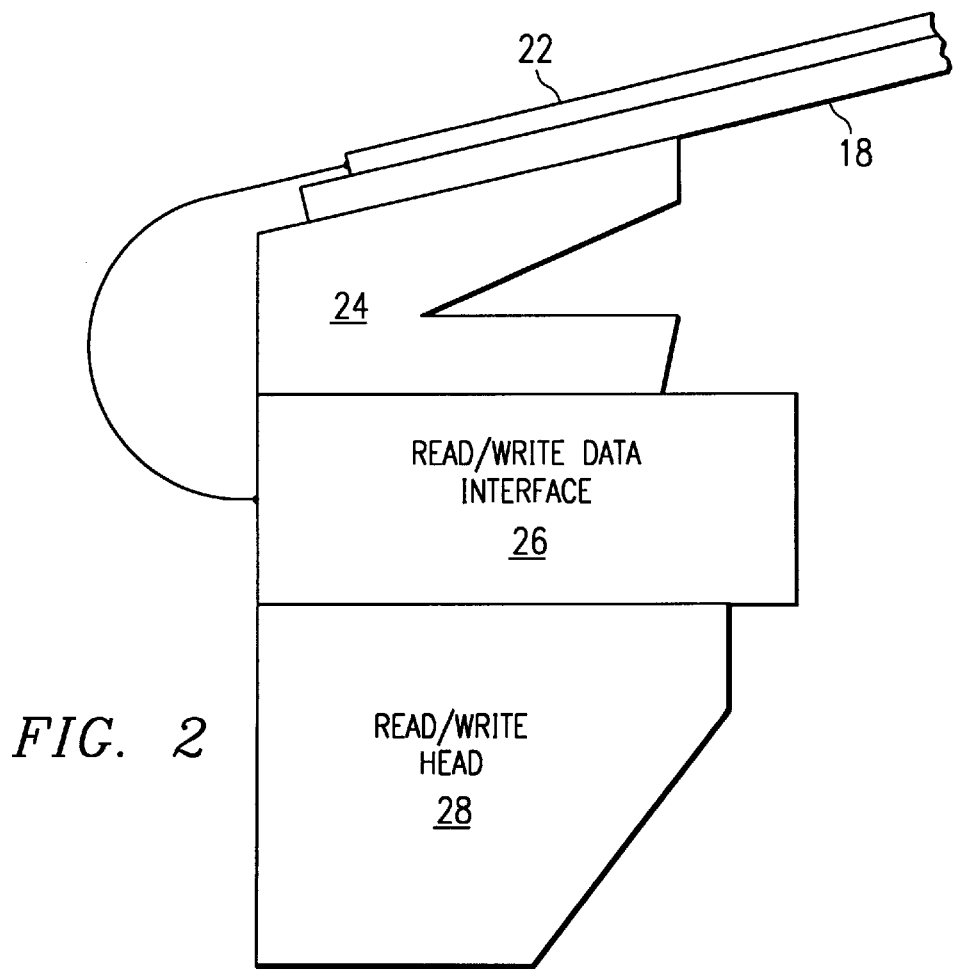
FIG. 2 is a block diagram illustrating an exemplary read/write head assembly that includes a read/write data interface and a read/write head provided at the end of one of the plurality of suspension arms.

FIG. 2 is a block diagram illustrating an exemplary read/write head assembly 20 that includes a gimbal 24, a read/write data interface 26, and a read/write head 28. The read/write head assembly 20, in the one embodiment of FIG. 2, is positioned at the end of suspension arm 18. Read/write head 28 also be referred to as a slider and may be provided in virtually any shape, size, or configuration but will generally be provided as a pico slider or a nano slider. A pico slider is generally provided with a length of 1.5 mm, a width of 0.96 mm, and a height of 0.255 mm; and a nano slider is generally provided with a length of 2.5 mm, a width of 1.6 mm, and a height of 0.425 mm. The gimbal 24 may or may not be provided as part of read/write head assembly 20 and may alternately be referred to as a flexure. A routing tube is also illustrated in FIG. 2 and is used to provide the electrical conductors that are used to transfer the various signals that are exchanged between the disk control circuitry of the hard disk drive and read/write head assembly 20.

It should be noted at the outset that the arrangement of the various elements of read/write head assembly 20 as illustrated in FIG. 2 are merely one possible configuration or embodiment of read/write head assembly 20. For example, gimbal 24 may be provided between read/write data interface 26 and read/write head 28. In other embodiments, intermediate devices or elements may be provided between read/write data interface 26 and read/write head 28. Alternately, read/write data interface 26 may be mounted side-by-side with read/write head 28. In still other embodiments, read/write head assembly 20 may not be mounted at the end of suspension arm 18 as illustrated, but may be mounted somewhere between the end of suspension arm 18 as shown and the other end of suspension arm 18. Similarly, gimbal 24 may be provided in numerous configurations and arrangements different from the simplified gimbal 24 that is illustrated in FIG. 2. Furthermore, the relative size of read/write data interface 26 and read/write head 28 will generally be provided such that read/write data interface 26 will be larger than read/write head 28; however, in alternative embodiments, read/write data interface 26 may be smaller than read/write head 28 or the same size as read/write head 28. This depends on the particular design being implemented and the fabrication technology being used. All of these various example and alternative configurations, and other variations thereof, are contemplated by the present invention and thus fall within the scope of the present invention.

In the one embodiment of FIG. 2, a read/write head assembly 20 is provided at the end of each one of the plurality of suspension arms of hard disk drive assembly 10. The present invention contemplates that read/write data interface 26 will be provided in close proximity to read/write head 28 or will be directly coupled to read/write head 28. Close proximity, as defined herein, shall be any distance up to the length of a suspension arm, such as suspension arm 18. Depending on the particular embodiment, the suspension arm may be any of a variety of lengths such as, for example, one inch, two inches, and three inches. For example, read/write head 28 may be provided at the end of suspension arm 18, as illustrated in FIG. 2, while read/write data interface 26 may be provided at some other or intermediate location on suspension arm 18 which will be in close proximity by definition. In still other embodiments, read/write data interface 26 may be positioned in close proximity to read/write head 28 but will not be mounted or coupled to suspension arm 18. In such a case, read/write data interface 26 may couple to another suspension arm or to some other device that is not a suspension arm.

In operation, digital signals, such as a digital read signal and a digital write signal, may be provided through the conductors provided in routing tube 22 and then provided to read/write data interface 26. Read/write data interface 26 will include processing circuitry, as detailed more fully below in connection with FIG. 3, so that the digital data may be converted to the analog domain and exchanged with read/write head 28. The fact that read/write data interface 26 and read/write head 28 are provided in close proximity to one another significantly increases the signal-to-noise ratio of the entire hard disk drive system and significantly improves the bit error rate.

Figure 3:
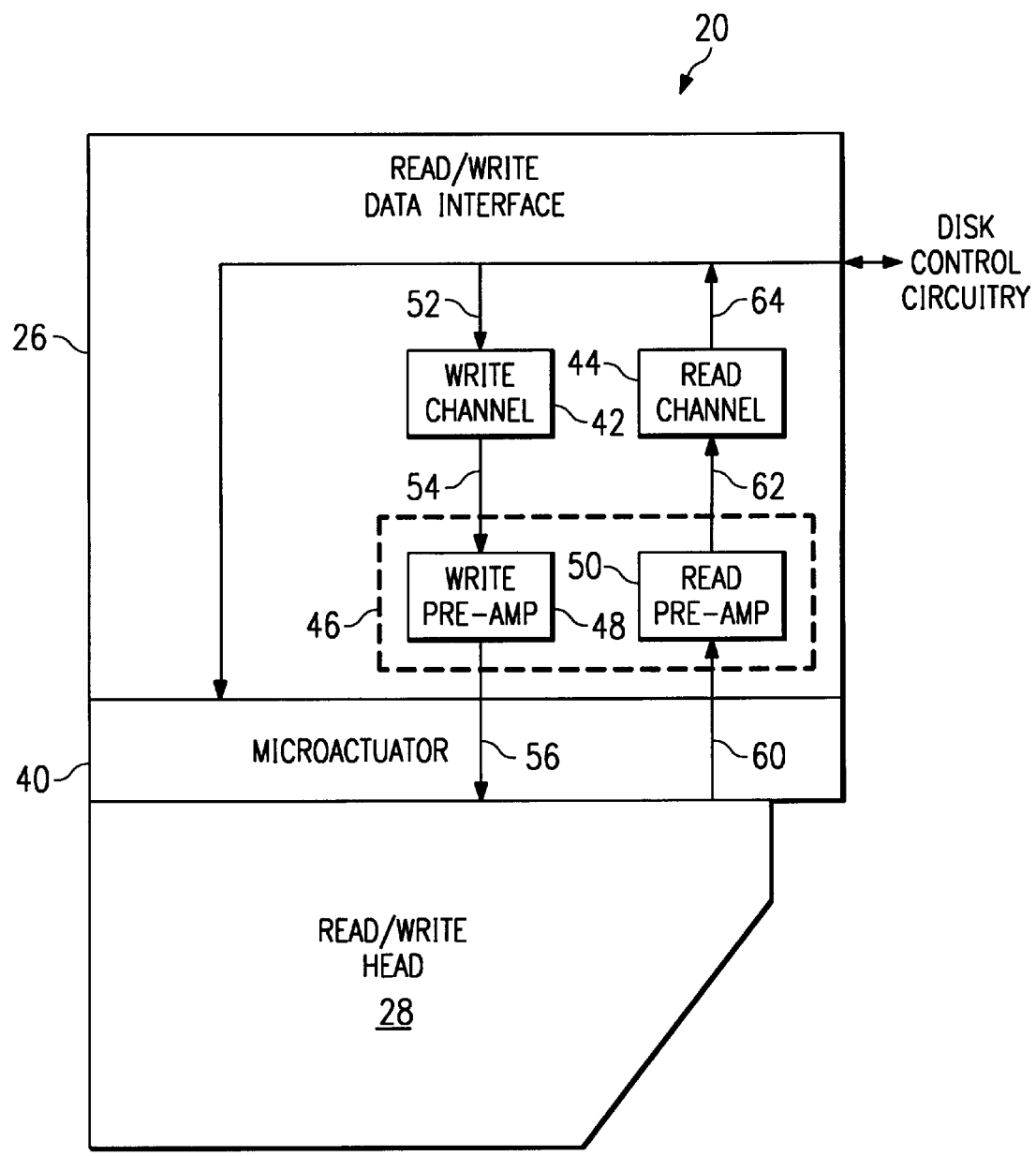
FIG. 3 is an expanded block diagram illustrating the read/write head assembly and an exemplary implementation of the read/write data interface.

FIG. 3 is an expanded block diagram illustrating read/write head assembly 20 and an exemplary implementation of read/write data interface 26. Read/write head assembly 20, in the embodiment shown in FIG. 3, includes read/write data interface 26 and read/write head 28. The exemplary implementation of read/write data interface 26 includes a microactuator 40, a write channel 42, a read channel 44, and a pre-amplifier 46 that includes a write pre-amplifier 48 and a read pre-amplifier 50. All of these elements or components may be manufactured using a single material such as silicon or other semiconductor materials.

Microactuator 40 may be referred to as a microelectromechanical system. As such, read/write data interface 26 includes both electronic circuitry, such as write channel 42, read channel 44, and pre-amplifier 46, along with a microelectromechanical system in microactuator 40.

Microactuator 40 is generally implemented in more advanced and higher capacity hard disk drives that require improved and precise tracking density. Microactuator 40 along with voice coil motor 16, as illustrated in FIG. 1, are both used to position read/write head 28. Generally, microactuator 40 receives a servo control signal and provides the fine tuning or high resolution positioning of read/write head 28 that is required with the higher tracking densities used in higher capacity hard disk drives. Microactuator 40 may be manufactured using silicon micromachining technology while the electronic circuitry of read/write data interface 26 may use, for example, CMOS type electronic circuitry. Preferably, read/write data interface 26 is manufactured using single crystal silicon which provides excellent mechanical and electronic properties. Microactuator 40 will generally be larger than read/write head 28 but, in other embodiments, it may be smaller than read/write head 28.

During a write operation, a digital write signal 52 is received from the disk control circuitry. The fact that digital write signal 52 is provided in the digital domain greatly reduces and lessens any noise problems that are normally encountered when high speed analog signals are transferred in a noisy environment between points that are not in close proximity with one another. Write channel 42 receives the digital write signal and processes the signal to generate a corresponding analog write signal 54. Analog write signal 54 is then provided to pre-amplifier 46 where write pre-amplifier 48 amplifies or conditions the signal further to generate an amplified analog write signal 56. Amplified analog write signal 56 is then provided to read/write head 28 so that a corresponding magnetic field or flux may be generated to store the data at a particular location on the magnetic media.

Write channel 42 may be implemented using any of a variety of circuitry elements and devices that are well known to one skilled in the art. For example, write channel 42 may include a scrambler circuit to randomize the data, an encoder, a serializer, and a write precompensation circuit. Digital write signal 52 will preferably be encoded using a run-length limited (RLL) encoder which enforces a pre-defined constraint such as the (0,4,4) constraint. The serializer, if needed, converts the signal from a parallel format into a serial format. The write precompensation circuit generates the analog write signal 54 and provides delays so that the signal may be properly provided to write pre-amplifier 48. Timing circuitry will also generally be provided as part of write channel 42 so that analog write signal 54 may be provided to pre-amplifier 46 at the correct time. It should also be mentioned that in other embodiments, pre-amplifier 46 may be implemented as separate circuitry units such that a write pre-amplifier 48 is provided and a read pre-amplifier 50 are provided distinctly from one another. Write pre-amplifier 48 may also be referred to as a write driver.

During a read operation, read/write head 28 generates an analog read signal 60 in response to detecting magnetic transitions at a particular location on a platter. Analog read signal 60 is then provided to read pre-amplifier 50 of pre-amplifier 46. Read pre-amplifier 50 amplifies analog read signal 60 to generate amplified analog read signal 62. Amplified analog read signal 62 is then provided to read channel 44 where the signal is processed and converted from the analog domain to the digital domain. In doing this, read channel 44 generates a digital read signal 64 which is then provided back to the disk control circuitry through the conductors provided in a routing tube, such as routing tube 22 of FIG. 2. The fact that digital read signal 64 is provided in the digital domain greatly reduces the noise problem that is encountered when high frequency signals are provided in the analog domain through a somewhat noisy environment. The techniques of the present invention result in an increased signal-to-noise ratio and a decreased bit error rate. Furthermore, the fact that read/write data interface 26 is provided in close proximity to read/write head 28, undesirable capacitive effects are eliminated.

Read channel 44 may be implemented using any of variety of available or known read channels. For example, the read channels discussed previously in the background may be used in the present invention. It should also be mentioned that not all the circuitry elements of read/write data interface 26 as illustrated in FIG. 3 are necessary to practice the present invention. For example, microactuator 40 may or may not be provided as part of read/write data interface 26. Similarly, write channel 42 and write pre-amplifier 48 may not be provided as part of read/write data interface 26.

Thus, it is apparent that there has been provided, in accordance with the present invention, a read/write data interface and method of operation that satisfy the advantages set forth above. Although the preferred embodiment has been described in detail, it should be understood that various and numerous changes, substitutions, and alterations can be made herein without departing from the scope of the present invention. For example, although the present invention has been described and illustrated with the read/write data interface mounted or coupled with the read/write head, the same or similar results and benefits contemplated by the present invention are also achieved when the read/write data interface is provided near or in close proximity to the read/write head. In this manner, the close proximity increases the signal-to-noise ratio and decreases the bit error rate. Furthermore, the direct connections illustrated herein could be altered by one skilled in the art such that two components or elements are merely coupled to one another through an intermediate device or devices, without being directly connected, while still achieving the desired results demonstrated by the present invention. For example, variations in the placement and coupling of the read/write data interface and the read/write head may be provided. More specifically, the read/write assembly could be provided such that a gimbal or another device is provided between the read/write data interface and the read/write head. Other examples of changes, substitutions, and alterations are readily ascertainable by one skilled in the art and could be made without departing from the spirit and scope of the present invention as defined by the following claims.

What is claimed is:

1. A read/write data interface for interfacing with a read/write head and positioned in close proximity to the read/write head, the read/write data interface comprising:

a pre-amplifier operable to amplify an analog read signal to generate an amplified analog read signal; and a read channel positioned on the read/write interface and operable to receive the amplified analog read signal and to generate a digital read signal.

2. The read/write data interface of claim 1, wherein the read/write data interface is positioned adjacent to the read/write head at the end of a suspension arm.

3. The read/write data interface of claim 1, further comprising:

a write channel operable to receive a digital write signal and to generate an analog write signal, and wherein the pre-amplifier is further operable to amplify the analog write signal to generate an amplified analog write signal.

4. The read/write data interface of claim 3, wherein the pre-amplifier includes a read pre-amplifier and a write pre-amplifier.

5. The read/write data interface of claim 4, wherein the write pre-amplifier is a write driver.

6. The read/write data interface of claim 1, further comprising:

a microactuator operable to position the read/write head.

7. The read/write data interface of claim 6, wherein the read/write data interface is implemented in semiconductor material.

8. The read/write data interface of claim 7, wherein the read/write data interface is a microelectromechanical system and an electronic system.

9. The read/write data interface of claim 6, wherein the microactuator is a micromachined device.

10. The read/write data interface of claim 1, wherein the read/write head is a magneto-resistive head.

11. The read/write data interface of claim 1, wherein the read/write data interface is implemented in silicon, the read/write head further comprising:

a write channel operable to receive a digital write signal and to generate an analog write signal, and wherein the pre-amplifier is further operable to amplify the analog write signal to generate an amplified analog write signal; and a microactuator operable to position the read/write head.

12. A read/write head assembly comprising:

a read/write head operable to generate an analog read signal; and a read/write data interface provided in close proximity to the read/write head, the read/write data interface including:

a pre-amplifier operable to receive the analog read signal and to amplify the analog read signal to generate an amplified analog read signal, and a read channel positioned on the read/write data interface and operable to receive the amplified analog read signal and to generate a digital read signal.

13. The read/write head assembly of claim 12, further comprising a gimbal coupled to the read/write data interface.

14. The read/write head assembly of claim 12, further comprising a gimbal coupled to the read/write head.

15. The read/write head assembly of claim 12, wherein the read/write head assembly is positioned on a suspension arm.

16. The read/write head assembly of claim 12, wherein the read/write head is implemented as a read head and a write head.

17. The read/write head assembly of claim 12, wherein the read/write data interface further includes:

a write channel operable to receive a digital write signal and to generate a corresponding analog write signal, the pre-amplifier further operable to receive and amplify the analog write signal to generate an amplified analog write signal, and the read/write head further operable to receive the amplified analog write signal.

18. The read/write head assembly of claim 12, wherein the read/write data interface further includes:

a microactuator operable to position the read/write head.

* * * * *